(No Model.)

J. W. HARD.
DENTAL INSTRUMENT.

No. 586,727. Patented July 20, 1897.

WITNESSES
J. Frank Culverwell,

INVENTOR
John W. Hard,
By John Shacklebun
Attorney

UNITED STATES PATENT OFFICE.

JOHN W. HARD, OF TACOMA, WASHINGTON.

DENTAL INSTRUMENT.

SPECIFICATION forming part of Letters Patent No. 586,727, dated July 20, 1897.

Application filed February 24, 1897. Serial No. 624,766. (No model.)

*To all whom it may concern:*

Be it known that I, JOHN W. HARD, a citizen of the United States, residing at Tacoma, in the county of Pierce and State of Washington, have invented certain new and useful Improvements in Dental Instruments; and I do hereby declare the following to be a full, clear, and exact description of the invention, such as will enable others skilled in the art to which it appertains to make and use the same.

My invention relates to improvements in dental instruments, and has for its object the provision of an improved instrument for extracting teeth, wherein a gripping device is provided which will automatically adjust itself to the shape of the teeth being operated upon and extract the same easily and quickly.

The invention consists in the details of construction hereinafter fully described, claimed, and illustrated in the accompanying drawings, in which—

Figure 1:
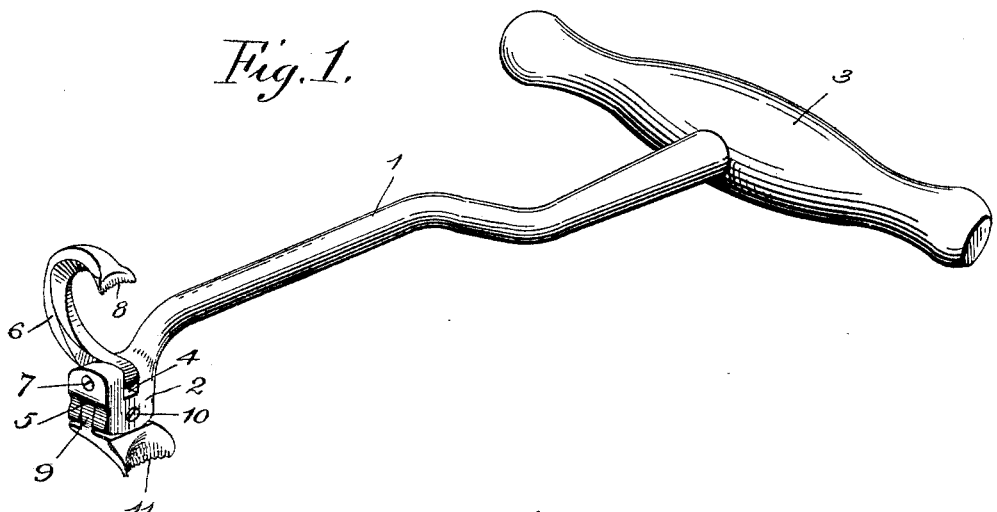
Figure 2:
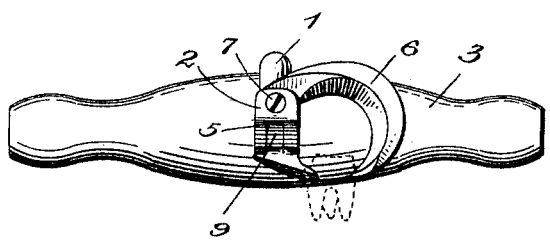
Figure 3:
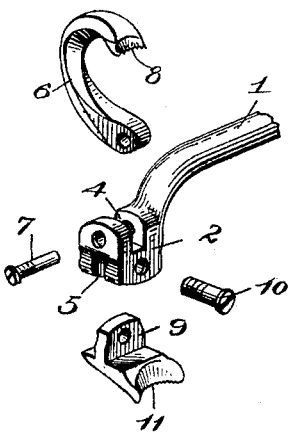

Figure 1 is a perspective view of my device. Fig. 2 is an end view, the teeth upon which it is operated being shown in dotted lines. Fig. 3 is a detached view.

Referring to the accompanying drawings, 1 indicates the stem of the handle, upon the inner end of which is formed the head 2. Upon the outer end of the stem is the handle portion 3, by means of which the tool is operated. The head 2 is provided with the recesses 4 and 5 in its upper and lower ends, respectively, said recesses being at right angles to each other. Pivoted in the recess 4 of the head is the swinging gripping member 6, which is pivotally secured by the screw 7. The free end of this gripping member is hollowed out as illustrated and provided with the teeth or serrations 8.

The fulcrum or stationary gripping member has the projection or shank 9 raised therefrom, said projection adapted to extend within the recess 5 of the head and be secured therein by the screw 10. This projection or shank is rounded upon its upper end, whereby a rocking movement of the head and swinging gripping member is permitted thereon.

The edge of the fulcrum is rounded out and provided with serrations 11, whereby it is fitted to the shape of the teeth being operated upon. The under surface of said fulcrum is rounded, as illustrated.

The operation of my implement is as follows: The instrument is positioned as illustrated in Fig. 2, the gripping member extending over and grasping the opposite side of the tooth to be extracted, while the serrated edge of the fulcrum or foot portion engages the other side of the tooth. In this position by a movement of the handle the tooth is readily extracted, the teeth upon the swinging member and the fulcrum preventing any disengagement of the parts. By providing the rocking movement of the head and swinging member upon the fulcrum or stationary member the gripping member is enabled to adjust itself according to the shape of the tooth, the tendency being to always draw toward the center of the same.

It will be readily understood that the position of the swinging and stationary members within the head can be reversed, so that the handle can be used either upon the left or the right side, as convenience and necessity may dictate.

The more difficult the tooth is to extract the tighter the grasp of the swinging member upon the same, the adjustment of the parts being automatic according to the resistance offered by the tooth.

It will be understood that various sizes of swinging gripping members and fulcrums or stationary members may be provided for operating upon different-sized teeth, one size being readily substituted for the other.

Having thus described my invention, what I claim as new, and desire to secure by Letters Patent, is—

1. A dental instrument comprising a stem, a head carried thereby, a swinging gripping member pivotally secured to the head and having its axis extending longitudinally of the stem, and a stationary gripping member constituting a fulcrum which is pivoted to the head with its axis extending transversely of the stem, substantially as described.

2. A dental instrument comprising a stem, a recessed head carried thereby, the recesses of said head being at right angles to each other, a swinging gripping member pivoted in one of said recesses, and a stationary gripping member pivoted in the other recess upon which the head and swinging member have a rocking movement, substantially as described.

In testimony whereof I have signed this specification in the presence of two subscribing witnesses.

JOHN W. HARD.

Witnesses:
 CHAS. L. STANSFIELD,
 ERNEST LISTER.